US005555395A

United States Patent [19]

Parks

[11] Patent Number: 5,555,395
[45] Date of Patent: Sep. 10, 1996

[54] SYSTEM FOR MEMORY TABLE CACHE RELOADS IN A REDUCED NUMBER OF CYCLES USING A MEMORY CONTROLLER TO SET STATUS BITS IN THE MAIN MEMORY TABLE

[75] Inventor: Terry J. Parks, Round Rock, Tex.

[73] Assignee: Dell U.S.A. L.P., Austin, Tex.

[21] Appl. No.: 449,858

[22] Filed: May 24, 1995

Related U.S. Application Data

[63] Continuation of Ser. No. 69,064, May 28, 1993, abandoned.

[51] Int. Cl.$^6$ ............................. G06F 12/00; G06F 13/00
[52] U.S. Cl. ..................... 395/472; 395/483; 364/243.4; 364/260.2; 364/DIG. 1; 364/964.2
[58] Field of Search ..................................... 395/445, 471, 395/472, 481, 416, 497, 418, 444, 468, 417, 483

[56] References Cited

U.S. PATENT DOCUMENTS

| | | | |
|---|---|---|---|
| 4,439,829 | 3/1984 | Tsiang | 395/445 |
| 4,800,489 | 1/1989 | Moyer et al. | 395/416 |
| 4,860,192 | 8/1989 | Sachs et al. | 395/400 |
| 5,155,824 | 10/1992 | Edenfield et al. | 395/425 |
| 5,202,972 | 4/1993 | Gusefski et al. | 395/425 |
| 5,278,962 | 1/1994 | Masuda et al. | 395/400 |
| 5,321,836 | 6/1994 | Crawford et al. | 395/400 |
| 5,325,508 | 6/1994 | Parks et al. | 395/425 |
| 5,394,529 | 2/1995 | Brown, III et al. | 395/375 |
| 5,442,757 | 8/1995 | McFarland et al. | 395/375 |

OTHER PUBLICATIONS

Clements, "Microprocessor System Design," 1992, 466–532.

*Primary Examiner*—Meng-Ai T. An
*Attorney, Agent, or Firm*—Jeffrey C. Hood

[57] ABSTRACT

A method and apparatus for reducing the latency of TLB and segment descriptor reloads by eliminating the extra read/write cycles normally required for these accesses. The CPU includes special cycles which perform segment descriptor and TLB reloads using only one cycle. The memory controller includes logic which returns the requested data back to the processor and, in addition, performs the required status bit modification. Therefore, the read/write cycle that was required in prior art designs to perform this status update is not required, but rather only a single read cycle is necessary to perform the same operation. In one embodiment, the memory controller includes logic which only performs the write to set the respective status bits in the case where the appropriate bits are not already set. This reduces the latency of subsequent memory cycles. In another embodiment, the memory controller asserts a completion signal back to the CPU to indicate that it has updated the status bits in the respective entry. If the CPU does not receive this signal, then it assumes the status update has not been performed and it performs a read/write cycle to set the respective status bits. This allows use of the present invention with prior art memory controllers as well as the caching of TLB and descriptor entries in the CPU cache.

22 Claims, 15 Drawing Sheets

Logical to linear to physical address translation

Page Directory Entry (Points to Page Table)

Translation Lookaside Buffer

SYSTEM FOR MEMORY TABLE CACHE RELOADS IN A REDUCED NUMBER OF CYCLES USING A MEMORY CONTROLLER TO SET STATUS BITS IN THE MAIN MEMORY TABLE

This is a continuation of application Ser. No. 08/069,064, filed on May 28, 1993, now abandoned.

FIELD OF THE INVENTION

The present invention relates to a method and apparatus for improving microprocessor performance, and more specifically to a method and apparatus for reducing the number of bus cycles required to set status bits during segment descriptor and translation lookaside buffer reloads.

BACKGROUND OF THE INVENTION

As increasingly large and complex software applications are developed for personal computers, a corresponding increase in computer performance is required to run these applications. Therefore, a principal area of research in the computer industry involves ways to increase computer system performance.

A computer system essentially comprises a microprocessor, computer memory, and various peripherals that are coupled to one or more common buses. Put simply, the memory stores program instructions and data, the microprocessor executes these program instructions to manipulate data or perform other operations, and the peripherals are used to display data and interact with the human user. While efforts are underway to increase the performance of virtually every aspect of the computer system, a primary area of research involves increasing the performance of the computer's microprocessor.

A brief discussion of the evolution of the Intel Corporation (Intel) 80X86 family of microprocessors is deemed appropriate. In 1981, International Business Machines Corp. (IBM) introduced its personal computer (PC). The IBM PC included an 8086 microprocessor from Intel which included a 16 bit data path and 20 address pins. Rather than incorporating 20 bit registers into the 8086, the 8086 used a segmented addressing scheme using a 16 bit segment register and 16 bit offset register. In order to generate a 20 bit address, the 16 bit segment and offset registers were loaded, the value in the segment register was shifted left four bit positions, and the offset was added to this value to produce the 20 bit address.

A later generation Intel microprocessor, the 80286 processor, included two modes of operation referred to as real mode and protected mode. In real mode, the 80286 emulated operation of the 8086 processor. Protected mode offered an entirely new segmentation scheme which allowed for the implementation of virtual memory, the use of privilege levels for memory protection, and a mechanism for separating memory assigned to different tasks in a multi-tasking environment. However, existing DOS applications could not be run in protected mode but rather were required to be run in real mode where they were still limited to one Mbyte of address space. Therefore, the next generation Intel processor, the 80386, introduced a new mode of operation referred to as V86 mode as well as a paging mechanism that could be used in addition to memory segmentation. The paging mechanism allowed DOS applications running in V86 mode to access extended memory, i.e., memory over one Mbyte.

To summarize, the Intel 80386 and later generation processors, the 486i and Pentium, include an on-chip memory management unit (MMU) which includes both segmentation and paging mechanisms. The address translation performed in the MMU allows implementation of virtual memory as well as various memory protection and separation features. For a more complete understanding of the problems solved by the present invention, a brief discussion of the MMU's operation follows. For more information on the operation of the MMU, please see the Intel Microprocessors Handbook, Vol. 1, 1993 edition, published by Intel Corporation.

MMU Address Translation

FIG. 1 illustrates the address translation performed by the MMU in protected mode. When an instruction requests the contents of a memory location, the instruction refers to the location not by an actual hardware or physical memory address, but by a virtual or logical address. The logical address must be translated into the appropriate physical memory address to access the desired location. As shown, the segmentation unit in the MMU translates the logical address into a linear address. If paging is not enabled, the linear address then becomes the physical address that is output from the processor to access the requested memory location, as shown. If paging is enabled, the paging mechanism further translates the linear address into a physical address which is then used to access the requested memory location.

1. Segmentation Unit

Referring now to FIG. 2, a more detailed illustration of the address translation that occurs in the MMU is shown. In protected mode, each block or segment of memory is described by a special structure called a segment descriptor. Segment descriptors reside in a set of system tables called descriptor tables. The CPU loads values referred to as a selector and offset in its segment and offset registers, respectively, and these values are used to access an address in a desired memory segment. In essence, the selector is a 16 bit value that serves as the virtual name for a memory segment, and the MMU uses the selector to index in the descriptor tables to the respective segment descriptor corresponding to the desired memory segment.

As shown in FIG. 3, a descriptor is a small (64 bit) block of memory that describes the characteristics of a much larger memory block or memory segment. The descriptor includes information regarding the segment's base address, its length or limit, its type, its privilege level and various status information. The segment's base address is the starting point in the segment's linear address space. As shown in FIG. 2, the offset portion of the logical address is added to the base address in the descriptor to generate the linear address of the desired memory segment. Among the status bits, a bit referred as the Accessed bit is automatically set by the CPU whenever a memory reference is made to the segment defined by the respective descriptor.

The Intel X86 family of processors also includes segment descriptor cache registers for each of its segment registers. Whenever a segment register's contents are changed, the 8-byte descriptor associated with that selector is automatically loaded (cached) in the respective segment descriptor cache register. This is referred to as a segment descriptor reload. Once loaded, all references to that segment use the cached descriptor information instead of reaccessing the descriptor from main memory.

When a memory access occurs, and the desired descriptor does not reside in a segment descriptor cache register, then the CPU is required to retrieve the descriptor from main memory. The CPU must also perform a locked read/write cycle to main memory to set the Accessed bit in the descriptor. Therefore, 3 cycles, 2 reads and a write, are required for every segment descriptor reload. This requirement reduces computer system performance, especially if the desired segment descriptor is not cached in the microprocessor cache and hence these three cycles must propagate to main memory. Therefore, a method and apparatus is desired to reduce the number of cycles required for segment descriptor reloads and hence increase computer performance.

2. Paging Mechanism

Referring again to FIG. 2, once the segmentation unit has translated the logical address into a linear address, the linear address is provided to the paging mechanism to be translated into a physical address, assuming paging is enabled. Referring now to FIG. 4, the CPU uses two levels of tables to translate the linear address (from the segmentation unit) into a physical address, these being the page directory and the page tables. The CPU also includes an internal register referred to as control register 3 (CR3) which contains the physical starting address of the page directory. As shown in FIG. 4, the linear address produced by the segmentation unit includes a directory field which stores an index to the page directory. The directory value in the linear address is combined with the page directory base address in CR3 to index to the desired entry in the page directory.

Referring now to FIG. 5, each page directory entry contains the base address of a respective page table as well as information about the respective page table. As shown in FIG. 4, the page table base address stored in the respective page directory entry (FIG. 5) is combined with a page table index value stored in bits 12–21 of the linear address to index to the proper page table entry.

As shown in FIG. 6, a page table entry contains the starting or base address of the page frame being accessed as well as statistical information about the page. As shown in FIG. 4, the page frame base address in the page table entry is concatenated with the lower 12 bits of the linear address, referred to as the offset, to form the physical address. The physical address is output from the pins of the CPU to access the desired memory location.

a. Page Directory/Table Entries

Referring again to FIGS. 5 and 6, the lower 12 bits of each page table entry and page directory entry contain statistical information about pages and page tables respectively. The P or Present bit, bit 0, indicates if a page directory or page table entry can be used in address translation. The A or Accessed bit, bit 5, is set by the processor for both types of entries before a read or write access occurs to an address covered by an entry. For a page table entry, the D or Dirty bit, bit 6, is set to 1 before a write to an address covered by that page table entry occurs. The D bit indicates that an address in a page has been updated with new data and is typically used by the operating system to write back dirty pages in case a page is being swapped out. The D bit is undefined for page directory entries. When the P, A and D bits are updated by the microprocessor, the processor generates a read-modify-write cycle which locks the bus to prevent conflicts with other processors or peripherals.

b. Translation Lookaside Buffer

The performance of the paging mechanism would degrade substantially if the processor was required to access two levels of tables for every memory access. To solve this problem and increase performance, the MMU paging mechanism utilizes an internal cache memory referred to as the Translation Lookaside Buffer (TLB) which stores the most recently accessed page table entries. The TLB is a four-way set associative cache, meaning that the cache includes four banks of memory where a page table entry can be stored. The TLB also includes some form of a least recently used (LRU) replacement algorithm for adding new page table entries if the TLB is currently full. The least recently used entry is replaced by a new entry because statistically the LRU entry is the least likely to be requested in the future. Therefore, the TLB automatically keeps the most commonly used page table entries stored in the processor.

When the MMU requests a page table entry and the entry resides in the TLB cache, then a TLB hit occurs, and the entry is retrieved from the TLB without requiring a bus cycle or table lookups. However, if the requested entry does not reside in the TLB cache, then the requested entry is retrieved from the page tables in system memory and placed in the TLB. This is referred to as a TLB reload.

c. Paging Mechanism Operation

Referring now to FIG. 7, the paging mechanism operates in the following fashion. When the paging mechanism receives a linear address from the segmentation unit, the upper 20 bits of the linear address are compared with the entries in the TLB to determine if there is a match. If there is a match, referred to as a TLB hit, then the 32-bit physical address is calculated and placed on the address bus. The physical address is calculated using the page frame base address stored in the page table entry and the offset from the linear address as described above.

If the requested page table entry is not in the TLB, then a TLB reload occurs. The CPU first reads the appropriate page directory entry from memory. If the Present bit in the page directory entry indicates that the page table is in memory, then the CPU sets the Accessed bit in the page directory entry using a read/write cycle, calculates the page table entry address, and reads the appropriate page table entry. If the Present bit in the page table entry indicates that the requested page frame is in main memory, then the processor updates the Accessed and/or Dirty bits as needed using a read/write cycle and performs the memory access. The page table entry is stored in the TLB for possible future accesses according to the LRU replacement algorithm described above. If the Present bit for either the page directory entry or the page table entry indicates that the respective page table entry or page frame is not in memory, then the processor generates a page fault, which potentially means that the requested entry or page frame must be swapped in from disk.

Therefore, reading a new entry into the TLB, referred to as a TLB reload or refresh, is a two-step process and the sequence of data cycles required to perform a TLB refresh is as follows. First, the CPU must read the correct page directory entry from memory. If the Present bit in the entry equals 1, then the CPU must perform a locked read/write cycle to set the Accessed bit in the directory entry. Therefore, the directory entry will actually get read twice and written to once if the CPU needs to set any of the status bits in the entry. The CPU then reads the correct entry in the page table. If the Present bit is 1, then the CPU places the entry in the TLB and then performs a locked read/write to set the Accessed and/or Dirty bits in the page table entry. Here again, the page table entry will actually get read twice and written to once if the CPU needs to set any of the bits in the entry.

Therefore, every time a TLB reload is required, up to six memory accesses, four reads and two writes, are necessary to perform the reload and allow a single memory access to occur. In a situation where a majority of the TLB accesses are misses, then thrashing occurs whereby the TLB is continually reloading in new page table entries. This can cause a performance degradation of up to six times. The performance degradation can actually be much worse because a particular piece of data cannot be accessed until the entire virtual to physical translation has been completed. Therefore, an improved method and apparatus is desired to reduce the number of processor bus cycles required during both segment descriptor and TLB reloads.

SUMMARY OF THE INVENTION

The present invention comprises a method and apparatus for reducing the latency of TLB and segment descriptor reloads by eliminating the extra read/write cycles normally required for these accesses. According to the invention, the processor or CPU includes special cycles which perform segment descriptor and TLB reloads using only one bus cycle. The memory controller includes logic according to the present invention which returns the requested entry back to the processor and, in addition, performs the required status bit modification. Therefore, instead of requiring a read and read/write cycle, as in the prior art, a computer system according to the present invention only requires a single read cycle to perform the same operation. This potentially reduces the reload penalty by one-half and thus substantially increases computer performance.

When a segment descriptor reload is necessary, the CPU issues a cycle referred to as a descriptor read for access cycle using the address of the segment descriptor. In response to this cycle, the memory controller reads the respective entry, provides the entry to the CPU, sets the Accessed bit in the entry, and writes the entry back to memory. This cycle takes the place of the read and read/write cycles that were previously required and thus enhances the performance of segment descriptor reloads.

The CPU also includes two new types of bus cycles referred to as a TLB read for access and a TLB read for write. These cycles are used by the CPU to read page descriptor or page table entries and set the Accessed bit or Accessed and Dirty bits, respectively, in the respective entry. The memory controller interprets these cycles as a request to read the appropriate address in system memory, provide the requested entry to the CPU, set the respective status bits depending on the cycle type, and write the data back to the same address. Therefore, these new cycles substitute for the read and read/write cycles previously required to perform these operations.

In one embodiment of the invention, the memory controller includes logic which only performs the write to set the respective status bits in the case where the appropriate bits are not already set. In this embodiment, the memory controller examines the bits in the respective entry that were requested to be set by the CPU and determines if these bits are already set. If so, then the write is not performed. This reduces the latency of subsequent memory cycles.

In another embodiment, the memory controller and CPU include a handshake protocol whereby the memory controller asserts a completion signal back to the CPU to indicate that it has updated the status bits in the respective entry. If the CPU does not receive this signal, then the CPU assumes the status update has not been performed and it performs a read/write cycle to set the respective status bits. This allows a CPU having special cycles according to the present invention to be used in a system using a prior art memory controller that does not have logic according to the present invention to set status bits. This also allows a CPU according to the present invention to be used in a system where the respective entries are cached in a CPU cache. In either of these instances, the CPU will not receive a handshake signal and thus will perform a read/write cycle to set the respective status bits.

Therefore, a method and apparatus for improving computer system performance is disclosed. The CPU includes new processor bus cycles for performing segment descriptor and TLB reloads. The memory controller includes logic which performs the update of the status bits in response to these cycles without requiring the additional CPU read/write cycle that is otherwise required in prior art designs. This considerably reduces the number of cycles required for TLB and segment descriptor reloads and thus increases computer performance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
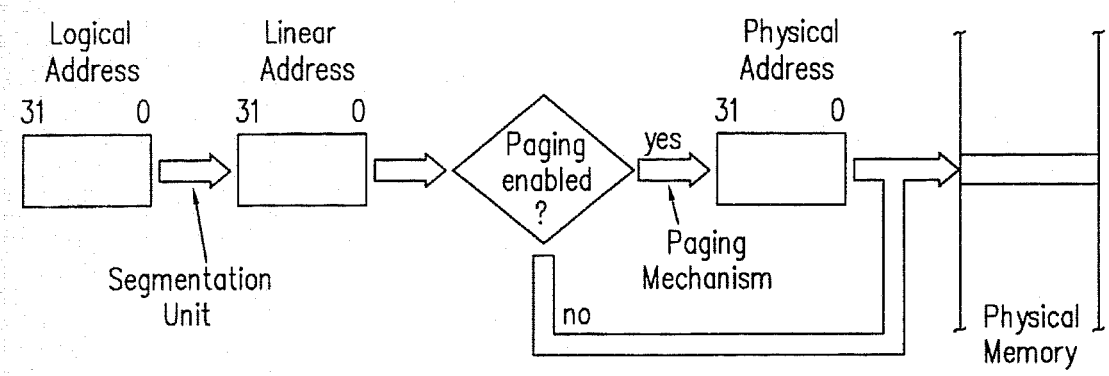
FIG. 1 illustrates the address translation that occurs in the memory management unit (MMU) of an Intel-compatible processor.
Figure 2:
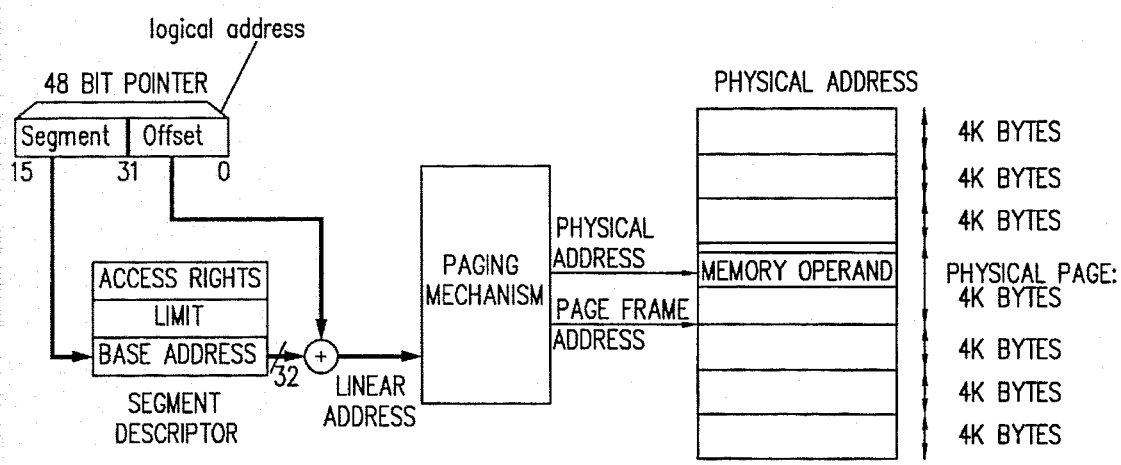
FIG. 2 illustrates in greater detail the address translation occurring in FIG. 1.
Figure 3:
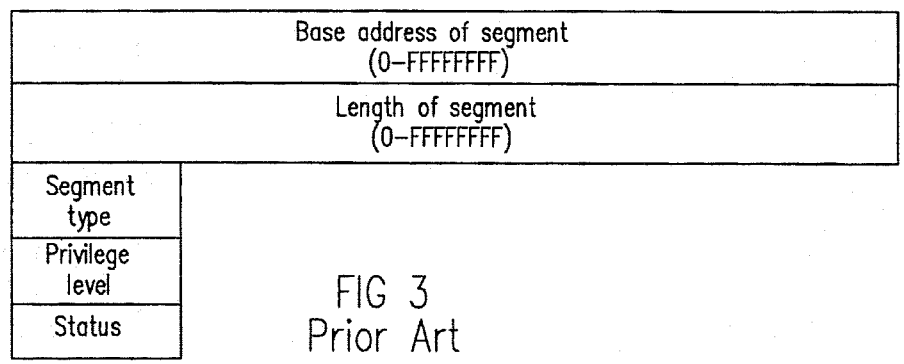
FIG. 3 illustrates the various fields in a segment descriptor.
Figure 4:
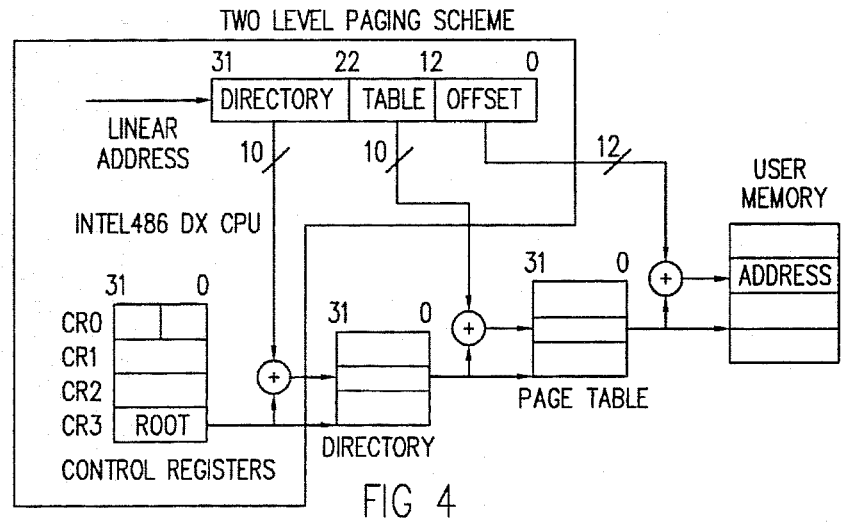
FIG. 4 illustrates operation of the two-level paging mechanism of the MMU of FIG. 1.
Figure 5:
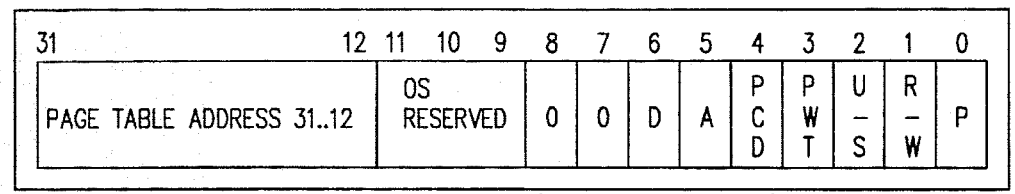
FIG. 5 illustrates page a directory entry which resides in the page directory of FIG. 4.
Figure 6:
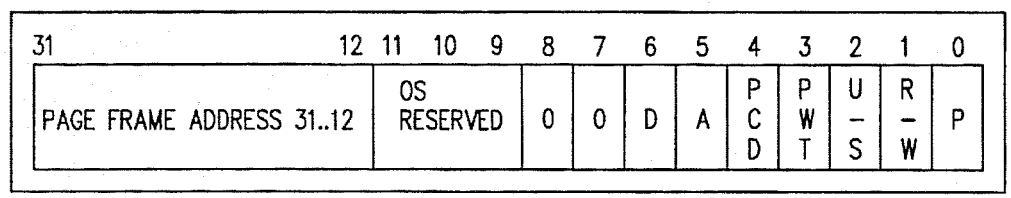
FIG. 6 illustrates a page table entry which resides in the page table of FIG. 4.
Figure 7:
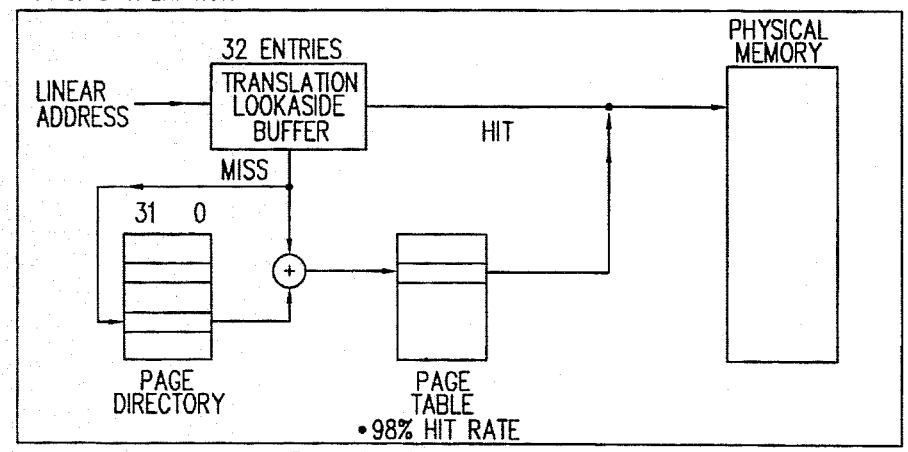
FIG. 7 illustrates paging operation in the MMU of FIG. 1.
Figure 8:
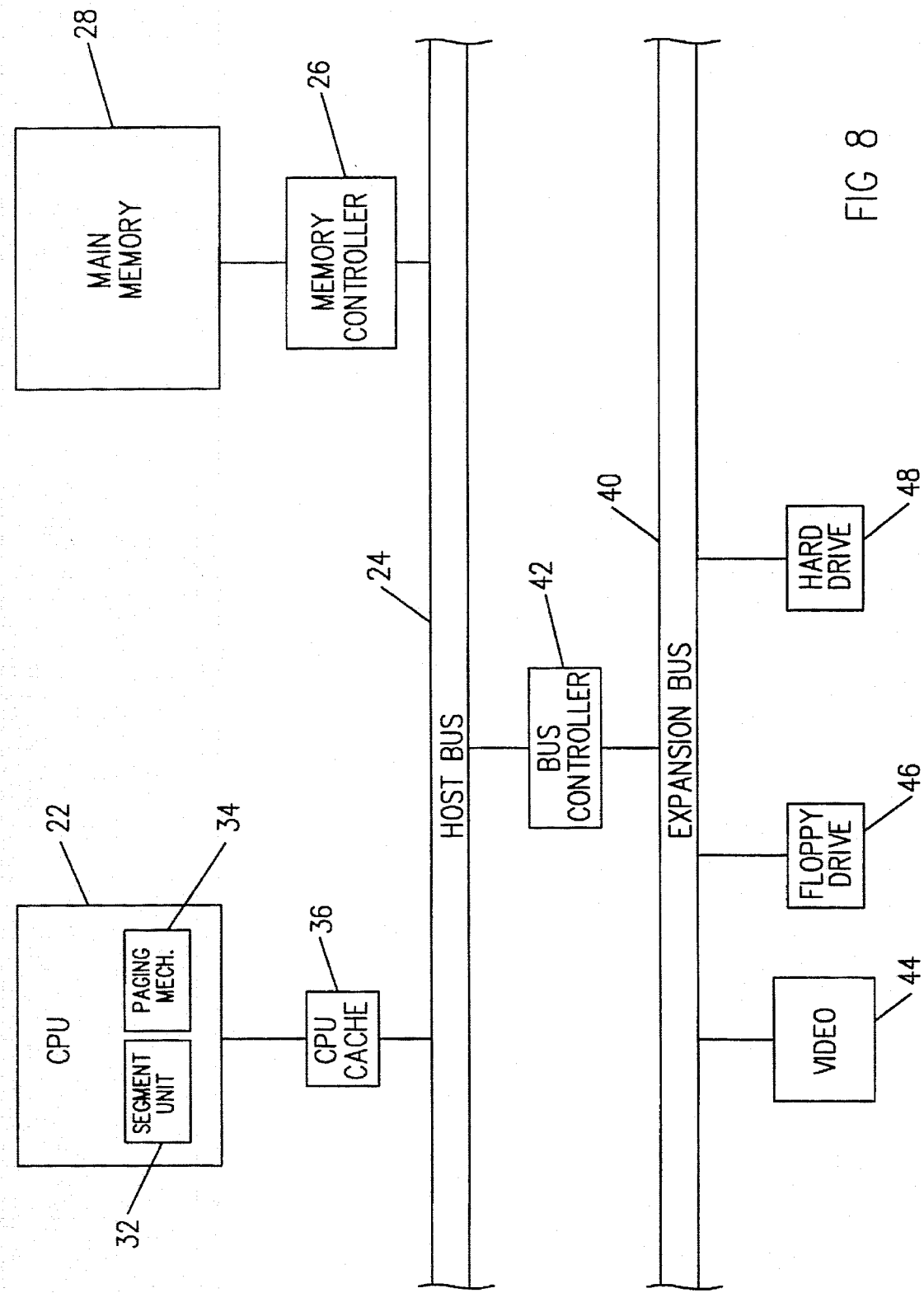
FIG. 8 illustrates a computer system according to the present invention.

Referring now to FIG. 8, a computer system incorporating the present invention is shown. The elements of a computer system not necessary to understand the operation of the present invention have been omitted for simplicity. The computer system includes a central processing unit or CPU 22 which is coupled to a memory or host bus 24. The CPU 22 preferably includes a cache memory 36 and may also include a separate internal cache memory (not shown). The host bus 24 includes address, data, and control portions. Main memory 28 is coupled to the host bus 24 by means of memory controller 26. The host bus 24 is coupled to an expansion or input/output (I/O) bus 40 by means of a bus controller 42. The expansion bus 40 includes slots for various other devices, including video 44, a floppy drive 46 and hard drive 48.

Figure 9:
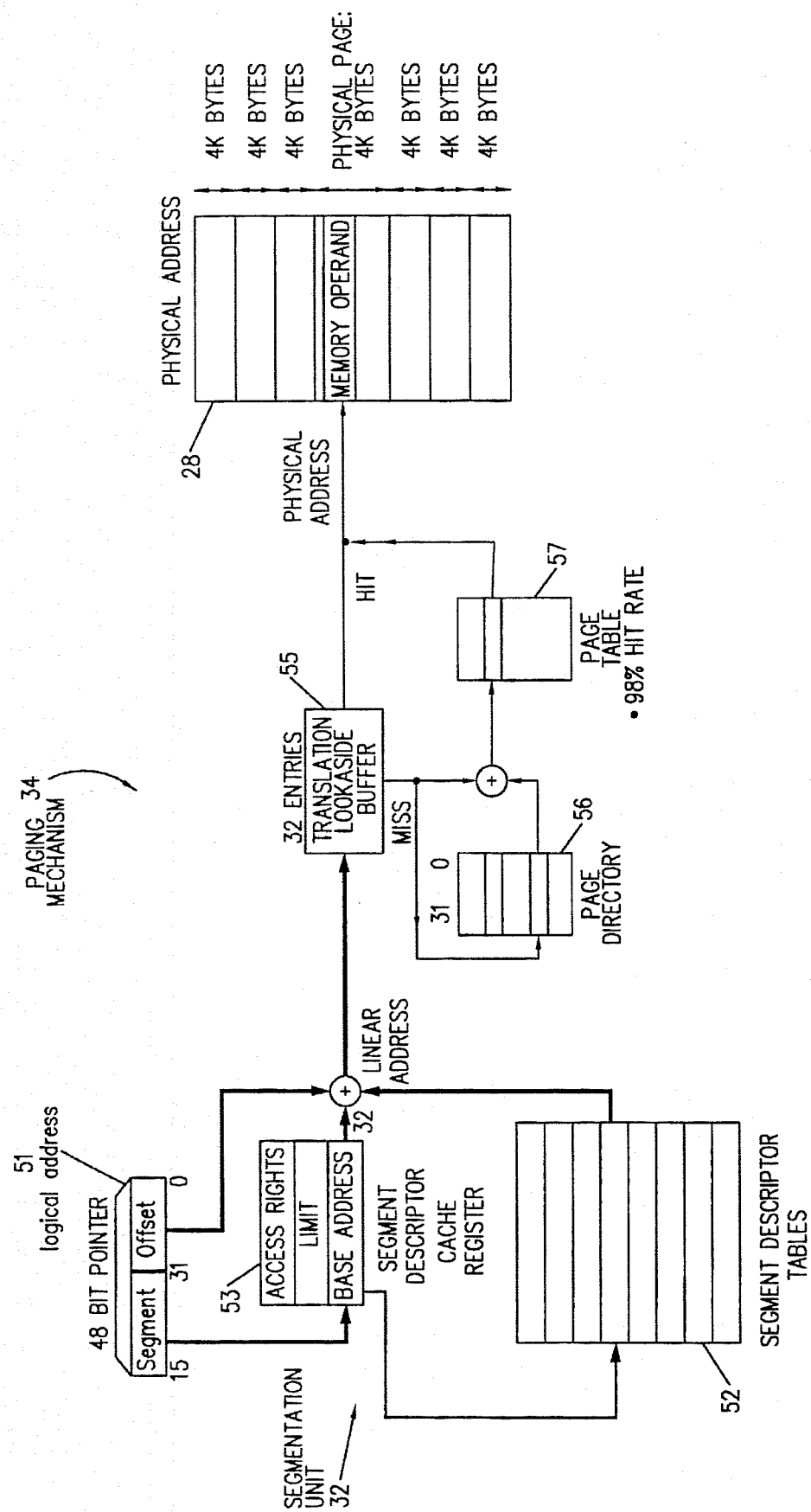
FIG. 9 illustrates the addressing scheme of the CPU of FIG. 8.

The CPU 22 preferably includes a memory addressing scheme similar to that described in the Background section, including both a segmentation unit 32 and paging mechanism 34. In the preferred embodiment, the CPU 22 is compatible with the X86 family of processors produced by Intel. For example, the CPU 22 may be an 80386, 486, or Pentium processor which has been modified to include new cycle types according to the present invention. The operation of the segmentation unit 32 and paging mechanism 34 according to the present invention is illustrated in FIG. 9. For more information on the operation of the segmentation and paging mechanisms used in the CPU 22 of the preferred embodiment, please see the Background section as well as the Intel Microprocessors Handbook, Vol. I, 1993 edition, which is hereby incorporated by reference.

Referring now to FIG. 9, the segmentation unit of CPU 22 receives a logical address 51 from a program which includes segment and offset values. The segment portion indexes into a descriptor in segment descriptor tables 52 which reside in main memory 28. The segmentation unit 32 includes a cache memory register 53 associated with each segment register that holds the most recently used descriptor. The segmentation unit 32 checks the segment descriptor cache register 53 to see if the requested descriptor resides in the cache register 53. If the descriptor does not reside in the descriptor cache register 53, then the CPU 22 must access the descriptor tables 52 in main memory 28 to retrieve the descriptor. This is referred to as a segment descriptor reload. The CPU 22 also causes certain status bits in the descriptor to be updated. Once the descriptor has been retrieved from either the segment descriptor cache register 53 or the descriptor tables 52, the segmentation unit 32 combines the base address in the descriptor and the offset portion of the logical address 51 to form a linear address which is then passed to the paging mechanism 34.

The linear address is compared with the addresses of entries in a page table entry cache referred to as the translation lookaside buffer (TLB) 55. If the entry resides in the TLB 55, referred to as a hit, then the entry is used in conjunction with the linear address to generate a physical address. If the entry does not reside in the TLB 55, then the paging mechanism 34 accesses a page directory 56 and respective page table 57 in main memory 28 to retrieve the requested page table entry. This is referred to as a TLB reload. The CPU 22 also causes certain status bits in the page directory and page table entries to be updated. The page table entry retrieved from main memory 28 is placed in the TLB 55 and is also used to generate a physical address. The physical address is then used to access the respective location in main memory 28.

Therefore, as discussed above and in the Background section, the CPU 22 must occasionally perform segment descriptor and TLB reloads which require the retrieval of entries from main memory 28. These reloads also require the CPU 22 to update status bits in these entries. Prior art designs required the CPU to generate a separate read/write cycle in addition to the original memory read to perform status bit updates. However, the CPU 22 includes new cycle types according to the present invention which perform segment descriptor and TLB reloads in a reduced number of cycles, thereby enhancing system performance.

The memory controller 26 includes logic according to the present invention which responds to segment descriptor and TLB reload cycles issued by CPU 22 to perform status bit updates without CPU involvement. In response to these cycles, the memory controller 26 reads the desired entry, provides the entry to the CPU 22, and updates the necessary status bits in the entry. By removing this burden from the CPU 22 and placing it in the memory controller 26, fewer CPU and host bus cycles are required, thus increasing system performance.

First Embodiment

Figure 10:
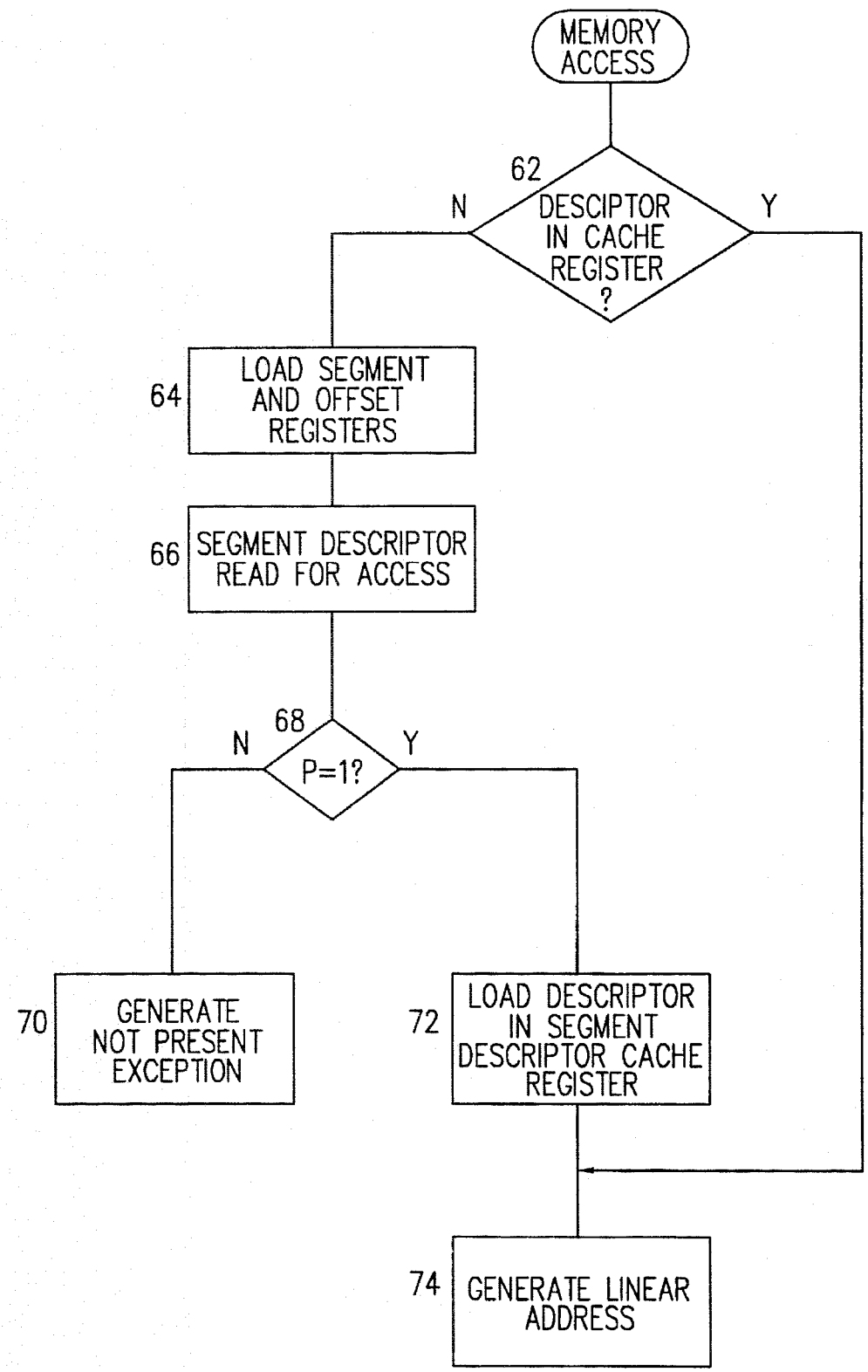
FIG. 10 illustrates operation of the segmentation unit in the CPU of FIG. 8.

Referring now to FIG. 10, the operation of the CPU segmentation unit 32 during segment descriptor reloads is shown. When a memory access occurs, the CPU 22 first checks the respective descriptor cache register 53 in step 62 to see if the descriptor resides there. If so, the CPU 22 generates a linear address in step 74 using information contained in the descriptor. If the requested descriptor does not reside in the descriptor cache register 53 in step 62, then in step 64 the CPU 22 loads the segment and offset registers with a selector and offset respectively. In step 66, the CPU 22 generates a segment descriptor read for access cycle.

Figure 11:
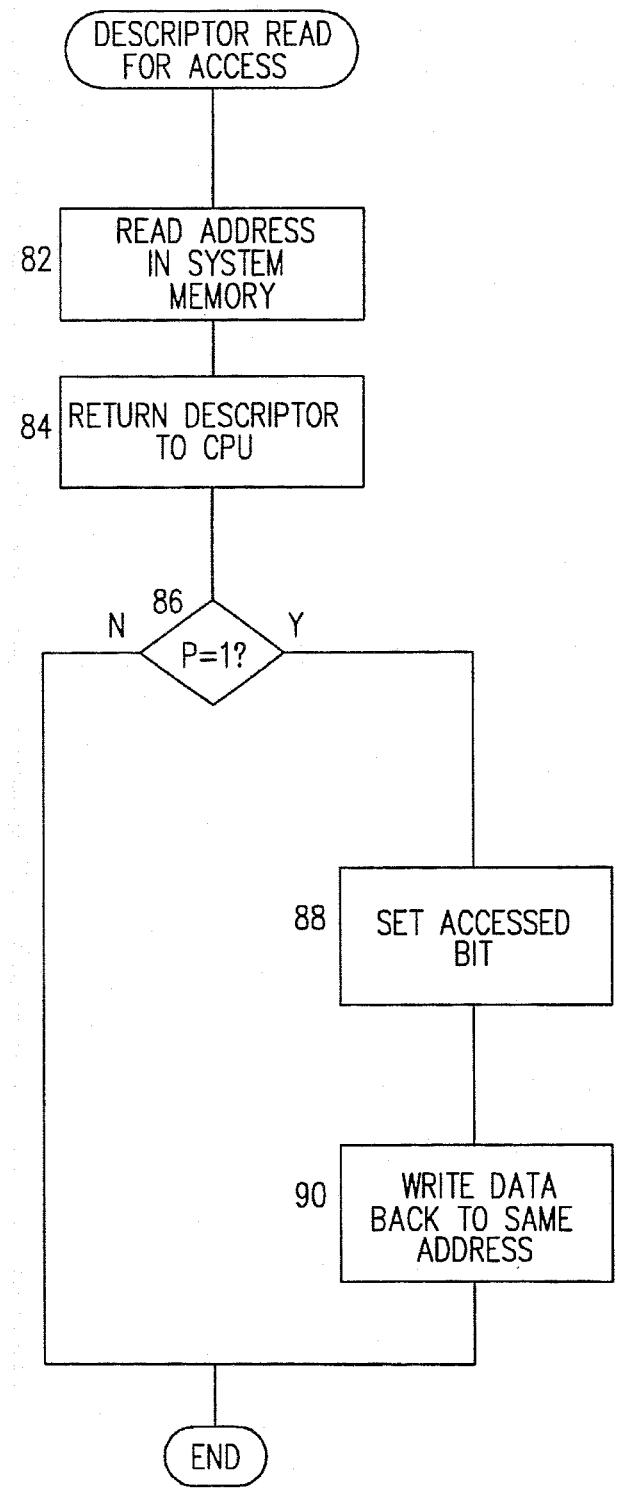
FIG. 11 illustrates operation of a descriptor read for access cycle which is initiated by the CPU in FIG. 10.

Referring now to FIG. 11, the operation of the memory controller 26 in response to a descriptor read for access cycle is shown. In response to this cycle, the memory controller 26 reads the address in main memory 28 in step 82 and returns the requested entry to the CPU in step 84. In step 86, the memory controller 26 determines if the Present bit P in the descriptor is 1. If so, then in step 88, the memory controller 26 sets the Accessed bit in the respective descriptor entry and then writes this entry back to the same address in step 90. The memory controller 26 then indicates completion of the cycle. If the Present bit P is 0 in step 86, then the memory controller 26 completes the cycle without setting the Accessed bit.

Referring again to FIG. 10, the CPU 22 receives the descriptor entry in response to its initiation of the segment descriptor read for access cycle in step 66. In step 68, the CPU 22 determines if the Present bit P in the descriptor is 1. If not, the CPU 22 generates a not present exception in step 70. If the Present bit P is 1 in step 68, then the CPU 22 loads the descriptor in a respective segment descriptor cache register 53 in step 72 and generates the corresponding linear address in step 74. The manner in which the segmentation unit generates the linear address from the descriptor entry is illustrated in FIG. 9 and discussed in the Background section.

Therefore, the CPU 22 performs a descriptor reload by using only one host bus cycle, the segment descriptor read for access cycle in step 66. This one cycle takes the place of the read cycle and read/write cycle that is required in prior art systems. In effect, the memory controller 26 performs the read/write cycle function of updating the respective status bit. By reducing the number of cycles required for a descriptor entry reload, this increases computer system performance.

Figure 12:
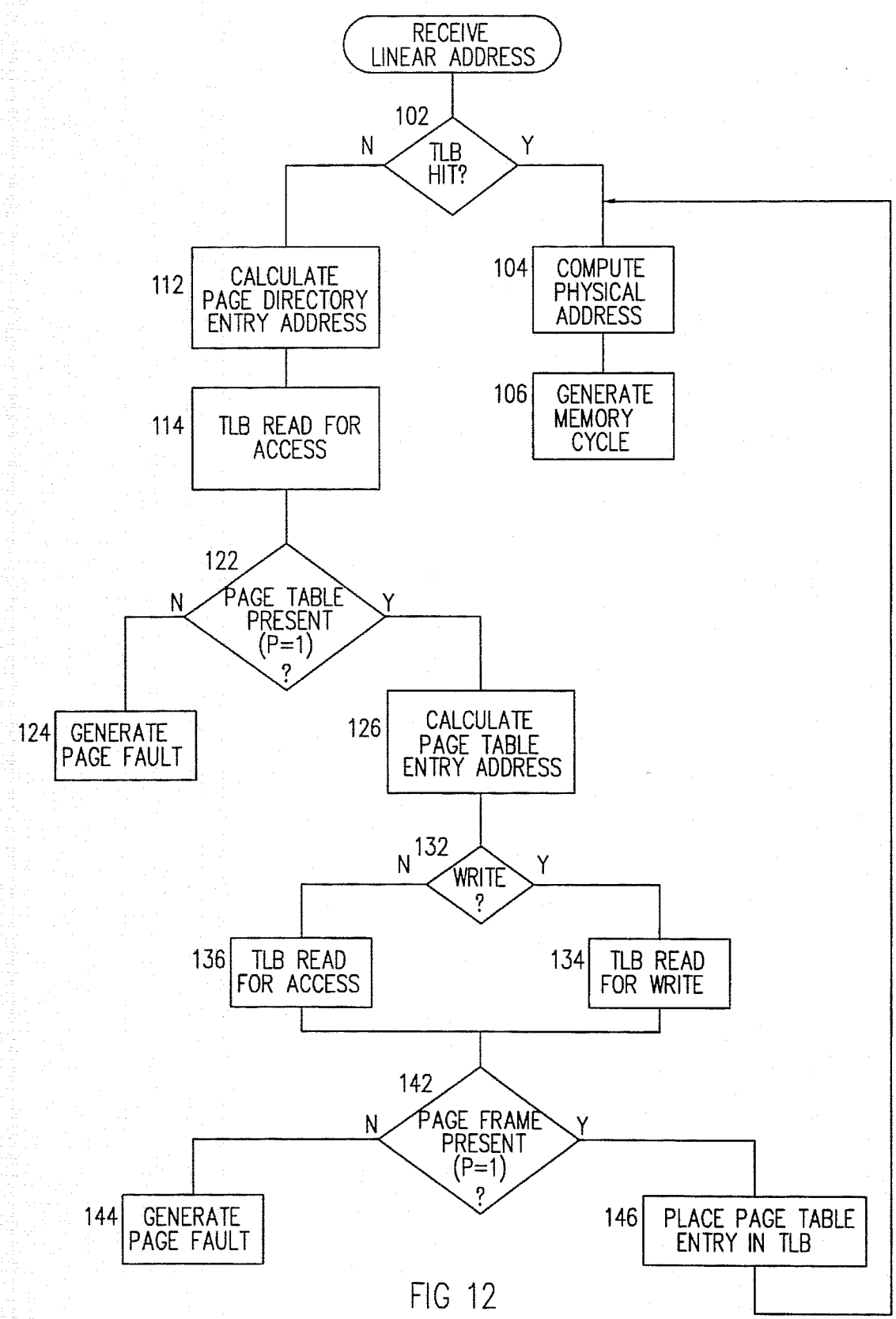
FIG. 12 illustrates operation of the paging mechanism in the CPU of FIG. 8.

Referring now to FIG. 12, the paging mechanism 34 in the CPU 22 of the present invention performs TLB reloads in the following fashion. When a linear address is received from the segmentation unit 32, then in step 102 the upper 20 bits of the linear address are compared with the entries in the TLB 55 to determine if there is a match. If there is a match, referred to as a TLB hit, then in step 104 the CPU 22 calculates the 32-bit physical address and initiates a bus cycle in step 106 by placing this address on the address bus. The physical address is calculated using the page frame base address stored in the page table entry and the offset from the linear address as described in the Background section.

If the requested page table entry is not in the TLB 55 in step 102, then a TLB reload is performed. The CPU 22 calculates the page directory entry address in step 112 and in step 114 initiates a TLB read for access cycle.

Figure 13:
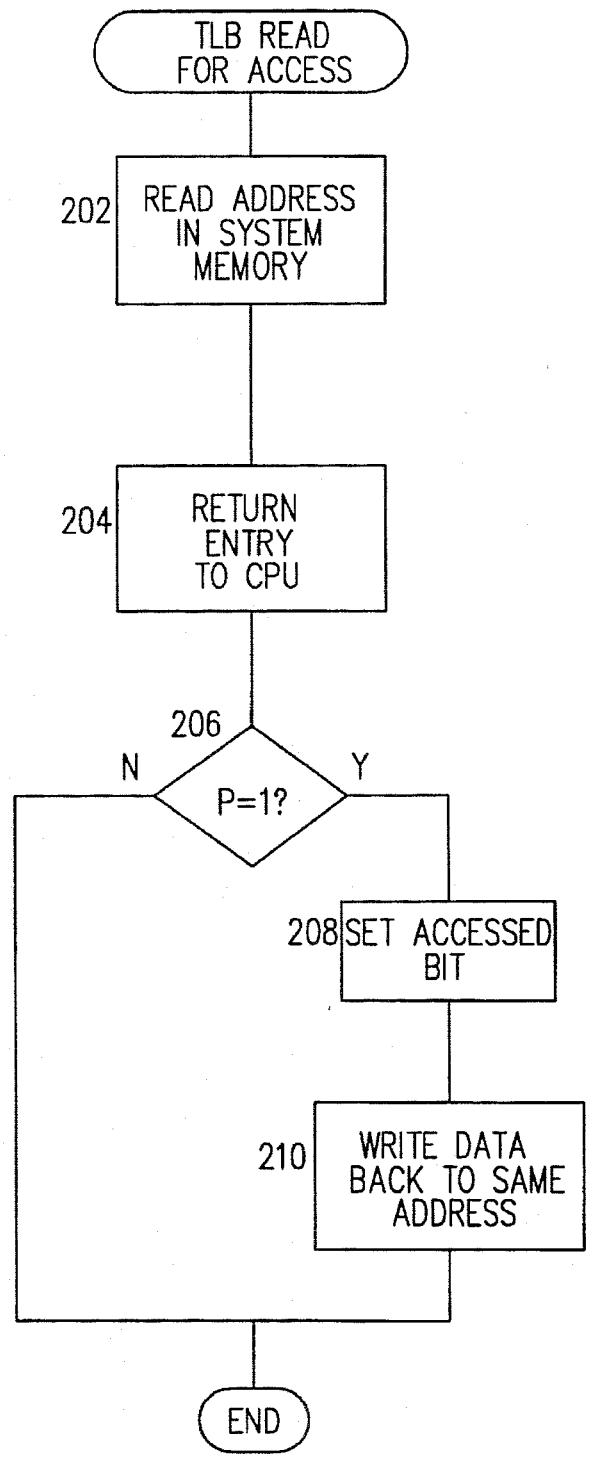
FIG. 13 illustrates operation of a TLB read for access cycle initiated by the CPU in FIG. 12.

Referring now to FIG. 13, the TLB read for access cycle directs the memory controller 26 to perform the following operations. In step 202, the memory controller 26 obtains the requested page directory entry from memory 28 and then returns this entry to the CPU 22 in step 204. In step 206, the memory controller 26 determines if the Present bit in the entry is one or zero. As discussed in the Background section, if the Present bit is one in the page directory entry, this indicates that the page table entry is present in main memory 28. If the Present bit is zero, then the respective page table entry is not present in memory 28 and a page fault must be generated by the CPU 22 to retrieve the desired entry. If the Present bit is one in step 206, then in step 208 the memory controller 26 sets the Accessed bit in the page directory entry and then writes the entry back to the same address in step 210. If the Present bit is zero in step 206, then the memory controller 26 completes the cycle without setting the Accessed bit in the entry.

Therefore, the TLB read for access cycle directs the memory controller 26 to read the directory entry in main memory 28, provide this entry to the CPU 22, and set the Accessed bit in the entry in main memory 28. The TLB read for access cycle takes the place of the read and read/write cycles that were required in prior art computer systems.

Returning again to FIG. 12, the CPU 22 receives the page directory entry back from the memory controller 26 in step 114 in response to the TLB read for access cycle. In step 122, the CPU 22 determines if the respective page table is present by checking the Present bit. If P is zero in step 122, then the CPU 22 generates a page fault in step 124. If P is one in step 122, then in step 126 the CPU 22 calculates the page table entry address to access the appropriate page table entry. If the current memory access being performed is determined to be a write operation in step 132, then in step 134 the CPU 22 generates a TLB read for write cycle. If the memory access is a read cycle, then in step 136 the CPU 22 generates a TLB read for access cycle.

Figure 14:
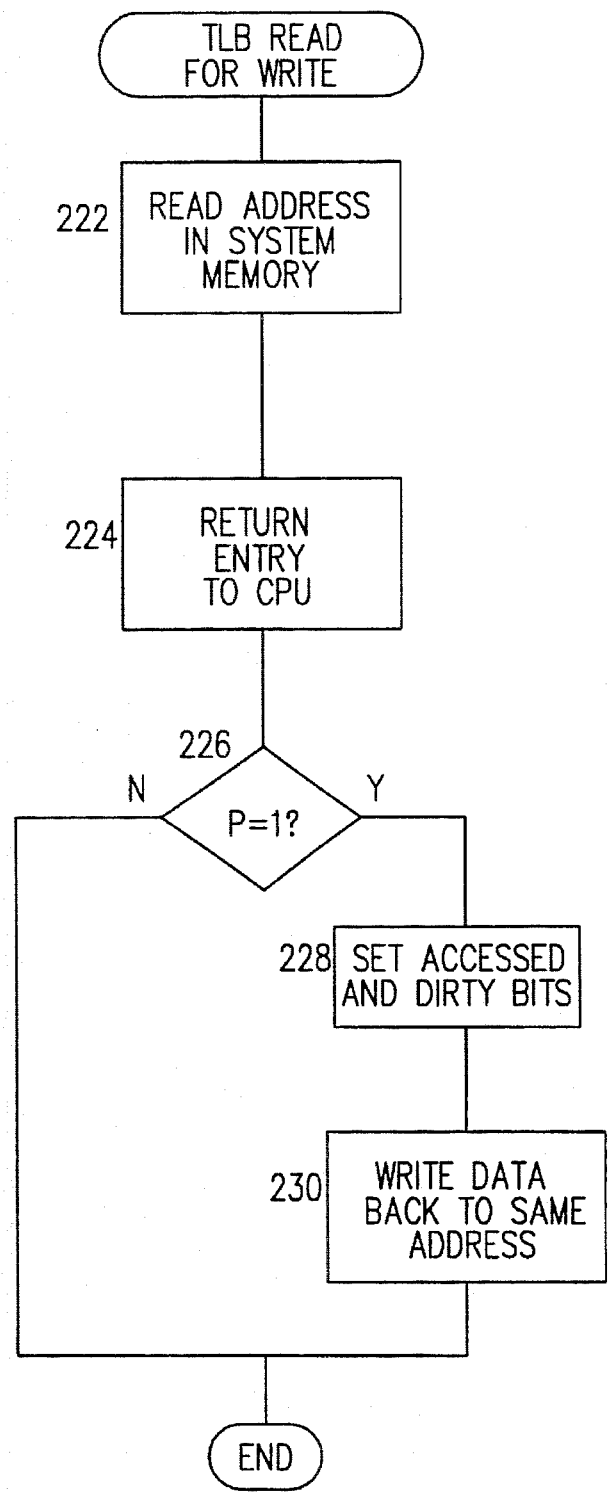
FIG. 14 illustrates operation of a TLB read for write cycle initiated by the CPU in FIG. 12.

Referring now to FIG. 14, the operation of the TLB read for write cycle is very similar to the TLB read for access cycle discussed previously. As with the TLB read for access cycle, in the TLB read for write cycle the memory controller 26 reads the address in system memory 28 in step 222, returns the entry to the CPU 22 in step 224, and checks the Present bit in step 226. If the Present bit is 1 in step 226, then the memory controller 26 sets both the Accessed and Dirty bits in step 228 before writing the data back to the same address in step 230. If the Present bit is 0, the memory controller 26 completes the cycle. Therefore, the only difference between the two cycles is that in the TLB read for access cycle the memory controller 26 only sets the Accessed bit in the respective entry in step 208, whereas in the TLB read for write cycle the memory controller 26 sets both the Accessed and Dirty bits in step 228.

Returning again to FIG. 12, in either of steps 134 or 136, the CPU 22 has received the requested page table entry from the memory controller 26. In step 142, the CPU 22 determines whether the Present bit is one or zero. If the Present bit is zero, indicating that the desired page frame is not present in main memory 28, then the CPU 22 generates a page fault in step 144. If the page frame is determined to be present in step 142, then in step 146 the CPU 22 places the page table entry in the TLB 46 and then advances to step 104. In step 104, the CPU 22 computes the physical address using the page table entry and then in step 106 generates the memory access to access the requested memory location.

Therefore, the segment descriptor read for access, TLB read for access, and TLB read for write cycles direct the memory controller 26 to read the address in system memory 28 and return the desired descriptor or entry to the CPU 22. These cycles also direct the memory controller 26 to update the necessary status bits in the descriptor entry according to the present invention. By placing this function in the memory controller 26, this obviates the necessity of an additional CPU read/write cycle to set these bits and thus increases computer performance.

In each of the read for access and read for write cycles discussed above, the memory controller 26 checks the value of the Present bit prior to setting the respective status bits. This is because prior art processors compatible with the Intel X86 family of processors determine if the Present bit is set prior to performing a read/write cycle to set the respective status bits. Since the preferred embodiment of the invention uses a CPU compatible with the Intel X86 family, the memory controller 26 in the preferred embodiment also determines if the Present bit is set prior to setting the respective status bits. However, it is noted that this determination is not necessary in other embodiments using processors that are not compatible with the Intel X86 family or otherwise do not require that this bit be checked.

Preferred Embodiment

In an alternate and preferred embodiment of the invention, the memory controller 26 and CPU 22 include a handshake protocol whereby the memory controller 26 asserts a signal back to the CPU 22 to indicate that it has updated the necessary status bits in the respective entry. In this embodiment, the host bus 24 includes a status update completion signal that is asserted by the memory controller 26 to indicate a status update has been completed. As explained below, this allows a CPU having special cycles according to the present invention to be used in a system using a prior art memory controller that does not have logic according to the present invention to set status bits. This also allows a CPU according to the present invention to be used in a system where the respective entries are cached in the CPU cache 36.

The preferred embodiment also includes a memory controller 26 which only sets the respective status bits in an entry where the appropriate bits are not already set. In this embodiment, the memory controller 26 examines the bits requested to be set by the CPU and determines if these bits are already set in their respective entry in main memory 28. If so, then the write is not performed. This reduces the latency of subsequent memory cycles.

Figure 15:
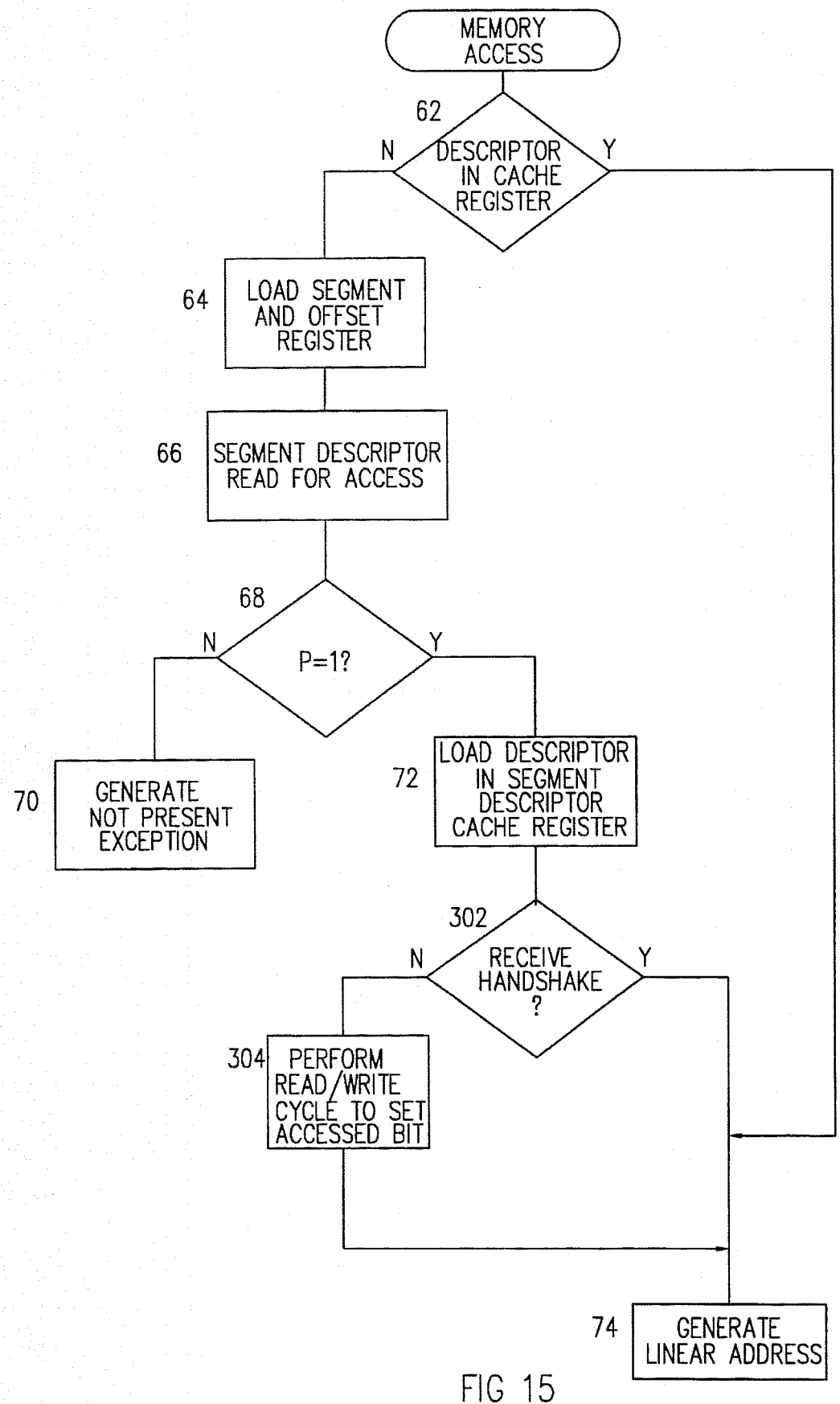
FIG. 15 illustrates operation of the CPU segmentation unit according to the preferred embodiment of the invention.

Referring now to FIGS. 15–19, the operation of the CPU 22 and memory controller 26 are identical to that illustrated in FIGS. 10–14 except where noted below. Steps in FIGS. 15–19 that are identical to steps performed in FIGS. 10–14 have the same reference numbers for convenience. Referring now to FIG. 15, when a memory access occurs the CPU 22 first checks the respective segment descriptor cache register 53 in step 62. If the requested descriptor does not reside in the descriptor cache register 53 in step 62, the CPU 22 loads the segment and offset register in step 64 and generates a segment descriptor read for access cycle in step 66.

Figure 16:
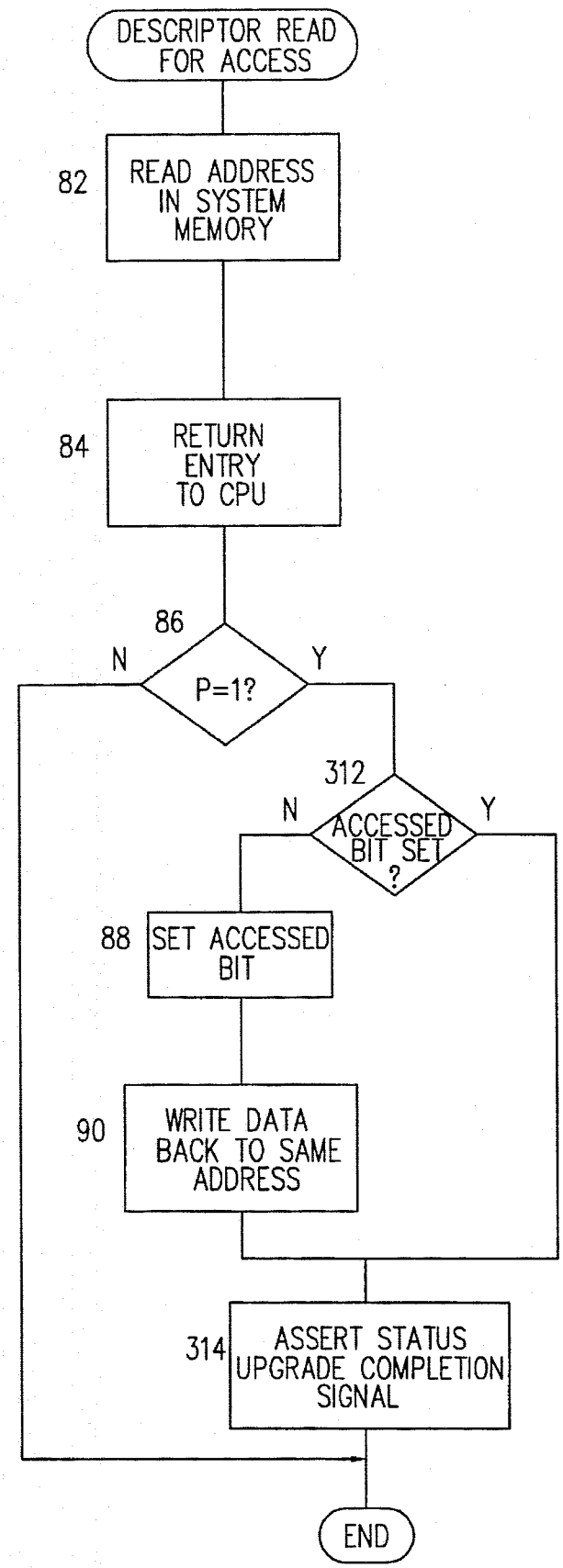
FIG. 16 illustrates operation of the descriptor read for access cycle initiated by the CPU in FIG. 15 according to the preferred embodiment of the invention.

Referring now to FIG. 16, the segment descriptor read for access cycle operates as follows. As with the descriptor read for access cycle in FIG. 11, the memory controller 26 reads the address in main memory 28 in step 82 and returns the entry to the CPU 22 in step 84. In step 86, the memory controller 26 determines if the Present bit is set. If not, the memory controller 26 terminates the cycle. If the Present bit is set in step 86, then the memory controller 26 determines if the Accessed bit is set in the respective entry in step 312. If the Accessed bit is set in step 312, then the memory controller 26 advances to step 314 where it asserts the status update completion signal to the CPU 22. If the Accessed bit is not set in step 312, then the CPU 22 sets the Accessed bit in step 88 and writes the entry back to the same address in step 90. The memory controller 26 then asserts the status update completion signal in step 314.

Therefore, if the Accessed bit is already set in step 312, then the memory controller 26 does not have to perform steps 88 and 90. Thus, the memory controller 26 only performs the additional operations of setting the Accessed bit and writing the new entry back to main memory 28 if the Accessed bit is not already set. This reduces the latency of subsequent memory cycles and thus increases system performance.

Referring again to FIG. 15, in step 66 the CPU 22 receives the descriptor entry from the memory controller 26 as well as the asserted status update completion signal. It is noted that the status update completion signal is asserted only if a memory controller 26 according to the present invention is included in the system and the respective entry is not cached in the CPU cache 36. In step 68 the CPU 22 determines if the Present bit is 1. If not, a not present exception is generated in step 70. If P is 1 in step 68, then in step 72 the CPU 22 loads the descriptor received from the descriptor read for access cycle into the segment descriptor cache register 53 in step 72.

In step 302, the CPU 22 determines whether the status update completion signal was asserted by the memory controller 26. If the memory controller 26 includes logic according to the present invention, and the entry was not cached, then the CPU 22 will have received this handshake signal in response to the descriptor read for access cycle in step 66. If the handshake signal is asserted, then the CPU 22 advances to step 74 and generates the linear address. However, if the memory controller 26 does not include logic according to the present invention, then the CPU 22 will not have received the handshake signal. Also, if the respective descriptor entry was cached in the CPU's cache 36, then the segment descriptor read for access cycle in step 66 would not have propagated out onto the host bus 24 to the memory controller 26. In this instance, the CPU 22 will also not have received the handshake signal in step 302. If the handshake signal is not received in step 302 for either of these reasons, the CPU 22 then performs a read/write cycle in step 304 to set the Accessed bit in the respective entry in main memory 28 prior to generating a linear address in step 74.

It is noted that, if the respective entry being accessed is cached in the CPU cache 36, then the read/write cycle required to set the status bits does not require host bus cycles, and thus performance is not seriously impacted. Also, if a prior art memory controller is included in the system, then the benefits of the present invention are not realized.

Figure 17A:
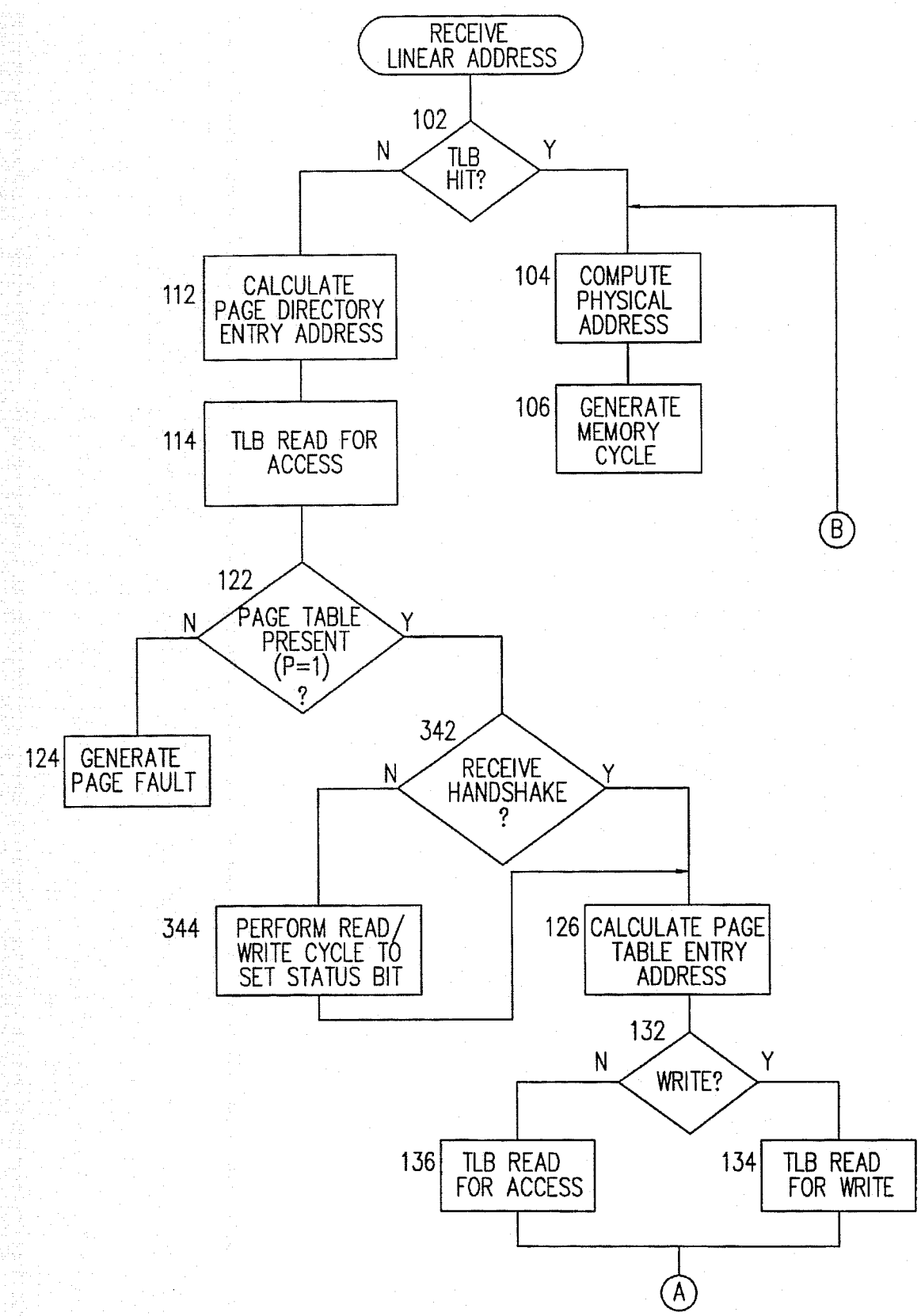
FIGS. 17a and 17b illustrate operation of the CPU paging mechanism according to the preferred embodiment of the invention.
Figure 17B:
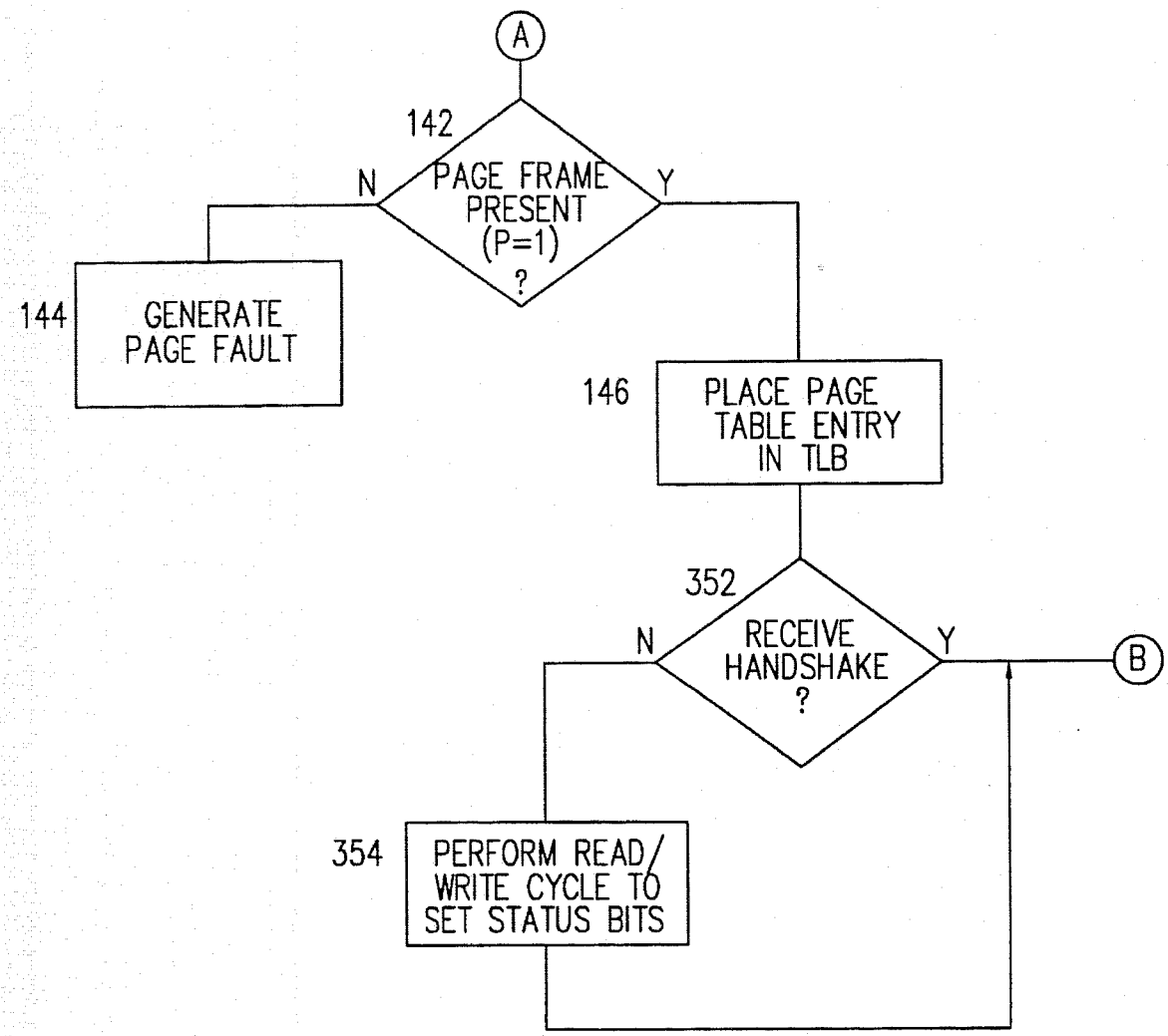

Referring now to FIGS. 17a and 17b, the operation of the CPU 22 in performing TLB reloads is similar to that illustrated in FIG. 12. In step 102, the CPU 22 determines if there is a TLB hit. If so, then the CPU 22 computes the physical address in step 104 and generates the memory cycle in step 106. If there is not a TLB hit in step 102, then a TLB reload is necessary. In step 112, the CPU 22 calculates the page directory entry address and in step 114 generates a TLB read for access cycle.

Figure 18:
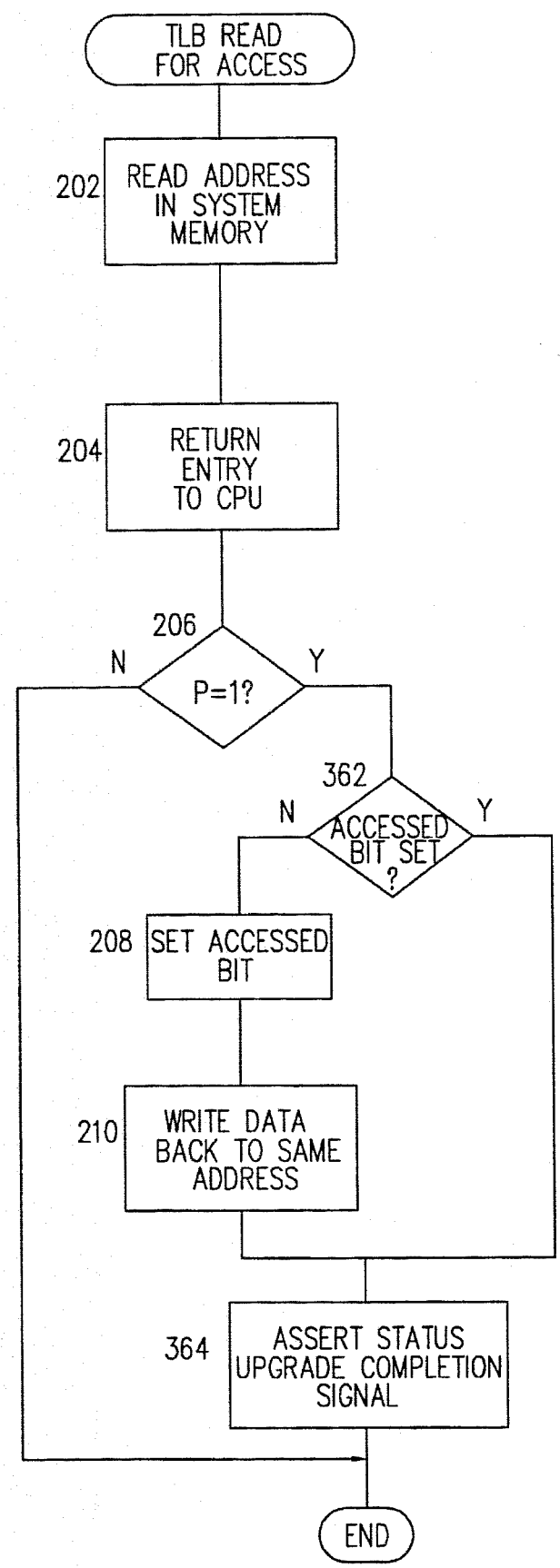
FIG. 18 illustrates operation of a TLB read for access cycle initiated by the CPU in FIG. 15 according to the preferred embodiment of the invention.

Referring now to FIG. 18, the TLB read for access cycle is similar to the TLB read for access cycle previously discussed with regard to FIG. 13. In response to this cycle, the memory controller 26 reads the address in system memory 28 in step 202 and returns the entry to the CPU 22 in step 204. In step 206, the memory controller 26 determines if the Present bit is one. If the Present bit is zero, then the memory controller 26 terminates the cycle. If the Present bit is one in step 206, then in step 362, the memory controller 26 determines if the Accessed bit is already set in the respective entry. If so, then the memory controller 26 asserts the status update completion signal in step 364 and then completes the cycle. If the Accessed bit is not already set in step 362, then in step 208 the memory controller 26 sets the Accessed bit and then writes the new data back to same address in step 210. The memory controller 26 then asserts the status update completion signal in step 364.

Referring again to FIG. 17a, when the TLB read for access cycle completes in step 114, the CPU 22 receives both the page directory entry and the asserted status update completion signal. As previously noted, the status update completion signal is only asserted assuming a memory controller 26 according to the present invention is being used in the system and the entry was not cached in the CPU cache 36. The CPU 22 then determines if the Present bit is one in step 122. If the Present bit is not one, then the CPU 22 generates a page fault in step 124. If the Present bit is one in step 122, then in step 342 the CPU 22 determines if the status update completion signal is asserted. If the handshake signal is asserted in step 342, then in step 126 the CPU 22 calculates the page table entry address and advances to step 132. However, if the handshake signal is not asserted from the memory controller 26 in step 342, then the CPU 22 performs the read/write cycle to set the respective status bit in step 344 before proceeding to step 126.

In step 132, the CPU 22 determines if a write or read memory access cycle is being performed. If a read cycle is being performed, then in step 136 the CPU 22 generates a TLB read for access cycle. The operation of this cycle was discussed above with reference to step 114 in FIG. 18. If the memory access is a write cycle, the CPU 22 then issues a TLB read for write cycle in step 134.

Figure 19:
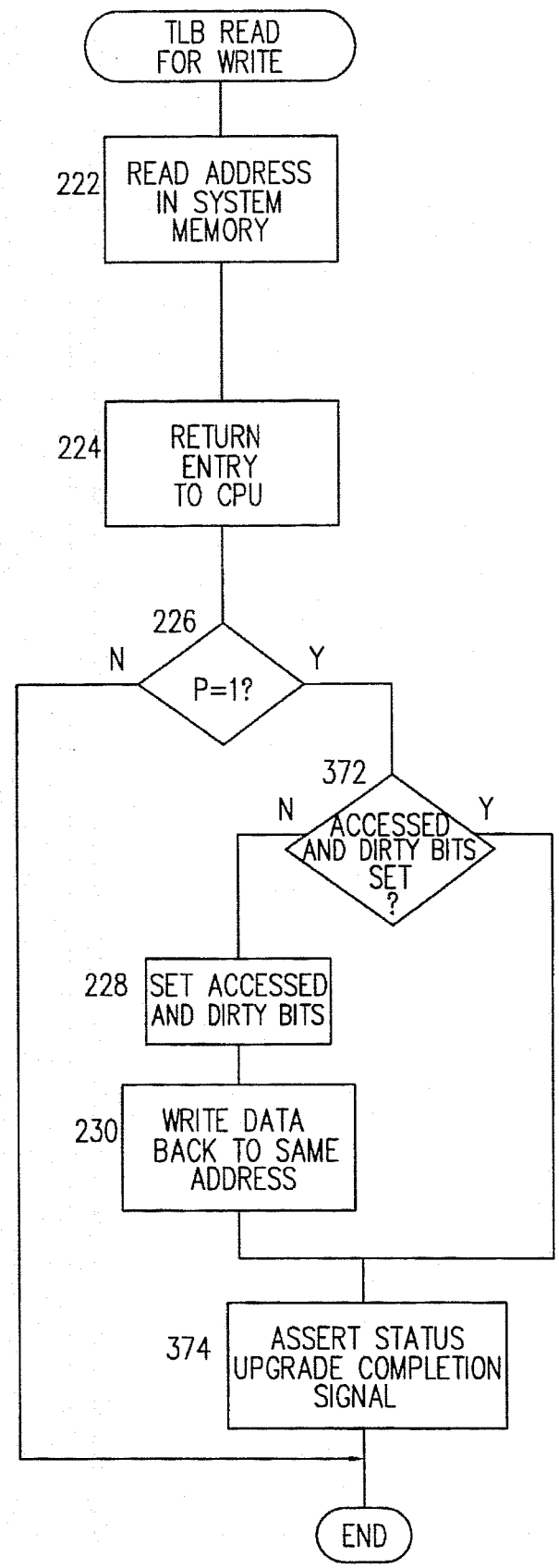
FIG. 19 illustrates operation of a TLB read for write cycle initiated by the CPU in FIG. 15 according to the preferred embodiment of the invention.

Referring now to FIG. 19, the TLB read for write cycle is identical to the TLB read for access cycle illustrated in FIG. 18 except that the memory controller 26 examines both the Accessed and Dirty bits in step 372 and sets both of these bits in step 228, as opposed to merely examining and setting the Accessed bit in steps 362 and 208 of FIG. 18. In response to this cycle, the memory controller 26 reads the address in system memory 28 in step 222 and returns the entry to the CPU 22 in step 224. In step 226, the memory controller 26 determines if the Present bit is one. If not, then the memory controller 26 terminates the cycle. If the Present bit is one in step 226, then in step 372, the memory controller 26 determines if the Accessed and Dirty bits are already set in the respective entry. If so, then the memory controller 26 asserts the status update completion signal in step 374 and then completes the cycle. If these bits are not already set in step 372, then in step 228 the memory controller 26 sets these bits and then writes the new data back to same address in step 230. The memory controller 26 then asserts the status update completion signal in step 374.

Upon completion of either the TLB read for access or TLB read for write cycles in steps 136 and 134, respectively, the CPU 22 will have received the respective page table entry. The status update completion signal is also asserted if the memory controller 26 includes logic according to the present invention and the respective page table entry was not cached in the CPU cache 36. The CPU 22 then advances to step 142 (FIG. 17b) and determines if the Present bit is one. If the Present bit is zero, then the CPU 22 generates a page fault in step 144. If the Present bit is one in step 142, then the CPU 22 places the page table entry in the TLB 55 in step 146. The CPU 22 then determines if the handshake signal was asserted from the memory controller 26 in step 352. If so, then the CPU 22 computes the physical address in step 104 (FIG. 17a) and generates the memory cycle in step 106. However, if the handshake signal is not asserted, then the CPU 22 performs a read/write cycle to set the status bits in step 354. The CPU 22 then computes the physical address in step 104 and generates the memory cycle in step 106.

The TLB read for access and TLB read for write cycles illustrated in FIGS. 18 and 19 are similar to the cycles shown in FIGS. 13 and 14. In the cycles illustrated in FIGS. 18 and 19, the memory controller 26 determines if the respective status bits are set prior to performing each status update. If the respective bits are already set, then the memory controller 26 asserts the status update completion signal and completes the cycle. However, if these bits are not set, then the memory controller 26 sets the bits and writes the updated entry back to the same address in step 210 before asserting the status update completion signal.

If the CPU 22 is included in a system having a prior art memory controller 26, then the CPU 22 will not receive a handshake signal from the memory controller 26. Also, if the respective entry being accessed is cached in the CPU's cache 36, then the cycle will not propagate to the memory controller 26, and thus no handshake will be returned to the CPU 22. In either instance, if the handshake signal is not asserted, then the CPU 22 performs a read/write cycle to set the respective status bits. This allows CPU's having new cycle types according to the present invention to be used with prior art memory controllers. This also allows page directory, page table and segment descriptor entries to be cached in the CPU cache without adversely impacting system performance.

Therefore, a method and apparatus for performing segment description and translation lookaside buffer reloads with reduced memory cycles is disclosed. Instead of requiring a separate read cycle and then read/write cycle for accesses to the page descriptor entries and page table entries, a single read/write cycle is now required. The memory controller includes logic that operates in conjunction with these read/write cycles to perform the desired status bit updates without requiring the extra read cycle. By reducing the number of cycles required for these reloads, this increases system performance.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed:

1. A computer system for performing memory table cache reloads in a reduced number of cycles, comprising:

a bus;

main memory coupled to said bus, wherein said main memory is configured to store memory tables, each of said memory tables comprising a plurality of memory table entries, wherein each of said plurality of memory table entries includes information regarding memory blocks in said main memory;

a processor coupled to said bus, said processor including a memory table cache configured to store a subset of said plurality of memory table entries, wherein said processor is configured to use said information in said plurality of memory table entries in said plurality of memory tables in the main memory to access data in said main memory, wherein said processor is configured to generate a memory table cache reload cycle to said main memory that causes one of said plurality of memory table entires to be read from said main memory into said memory table cache; and a memory controller coupled between said bus and said main memory, said memory controller being responsive to said memory table cache reload cycle to read one of said plurality of memory table entries from one of said memory tables, provide said one of said plurality of memory table entries to said processor, and set a status bit in said one of said memory table entries in said main memory, wherein said memory controller determines if said status bit in said one of said plurality of memory table entries is already set and, if said bit is set, does not set said status bit in said memory table entry.

2. The computer system of claim 1 wherein said bit set by said memory controller indicates an access to a memory address corresponding to said one of said plurality of memory table entries.

3. The computer system of claim 1 wherein said bit set by said memory controller indicates a write to a memory address corresponding to said one of said plurality of memory table entries.

4. The computer system of claim 1, wherein said memory controller checks a present bit in said one of said plurality of memory table entries and sets one or more status bits in said one of said plurality of memory table entries only if said present bit is set.

5. The computer system of claim 1, wherein said processor is compatible with Intel X86 family of microprocessors.

6. The computer system of claim 5, wherein said memory table cache is a translation lookaside buffer.

7. The computer system of claim 6, wherein one of said plurality of said memory table entries is a page directory entry.

8. The computer system of claim 5, wherein said memory table cache is a segment descriptor cache register.

9. The computer system of claim 8, wherein one of said plurality of said memory table entries is a segment descriptor.

10. A computer system for performing memory table cache, wherein said memory controller reloads in a reduced number of cycles, comprising:

a bus;

main memory coupled to said bus, wherein said main memory is configured to store memory tables, each of said memory tables comprising a plurality of memory table entries, wherein each of said plurality of memory table entries includes information regarding memory blocks in said main memory;

a processor coupled to said bus, said processor including a memory table cache configured to store a subset of said plurality of memory table entries, wherein said processor is configured to use said information in said plurality of memory table entries in said plurality of memory tables in the main memory to access data in said main memory, wherein said processor is configured to generate a memory table cache reload cycle to said main memory that causes one of said plurality of memory table entries to be read from said main memory into said memory table cache; and a memory controller coupled between said bus and said main memory, said memory controller being responsive to said memory table cache reload cycle to read one of said plurality of memory table entries from one of said memory tables, provide said one of said plurality of memory table entries to said processor, and set a status bit in said one of said memory table entries in said main memory asserts a status update completion signal to said processor after setting said status bit in said one of said plurality of memory table entries in said main memory; and wherein said processor performs a read/write cycle to set said status bit if said status update completion signal is not asserted.

11. The computer system of claim 10, wherein said memory controller determines if said status bit in said one of said plurality of memory table entries is already set and, if said bit is set, does not set said status bit in said one of said plurality of memory table entries; and wherein said memory controller asserts said status update completion signal to said processor if said status bit in said one of said plurality of memory table entries is already set.

12. A method for reloading a memory table cache in a computer system in a reduced number of cycles, said computer system comprising a bus, main memory coupled to said bus, said main memory storing memory tables, said memory tables comprising a plurality of memory table entries, wherein each of said plurality of memory table entries stores information regarding memory blocks in said main memory, said computer system further comprising a processor coupled to said bus, said processor including a memory table cache, said memory table cache storing a subset of said plurality of memory table entries, wherein said processor uses said information in said plurality of memory table entries to access data in said main memory said, computer system further comprising a memory controller coupled between said bus and said main memory, the method comprising the steps of:

the processor initiating a memory table cache reload cycle for causing said memory controller to load one of said plurality of memory table entries from said main memory into said memory table cache;

the memory controller reading said one of said plurality of memory table entries from one of said memory tables in said main memory responsive to said initiation of said memory table cache reload cycle;

the memory controller providing said one of said plurality of memory table entries to said processor;

the memory controller setting a status bit in said one of said plurality of memory table entries after said step of providing;

the memory controller writing said one of said plurality of memory table entries back to said main memory after said step of setting; the memory controller determining if said status bit in said one of said plurality of memory table entries is already set after said step of providing; and the memory controller performing said steps of setting said status bit in said one of said plurality of memory table entries and writing said one of said plurality of memory table entries back to said main memory only if said status bit is not already set.

13. The method of claim 12 wherein said status bit set by said memory controller indicates an access to a memory address corresponding to said one of said plurality of memory table entries.

14. The method of claim 12 wherein said status bit set by said memory controller indicates a write to a memory address corresponding to said one of said plurality of memory table entries.

15. The method of claim 12, further comprising said memory controller checking a present bit in said one of said plurality of memory table entries prior to said step of setting; and said memory controller performing said steps of setting and writing only if said present bit is set.

16. The method of claim 12, wherein said processor is compatible with Intel X86 family of microprocessors.

17. The method of claim 16, wherein said memory table cache is a translation lookaside buffer.

18. The computer system of claim 16, wherein said memory table cache is a segment descriptor cache register.

19. A method for reloading a memory table cache in a computer system in a reduced number of cycles, said computer system comprising a bus, main memory coupled to said bus, said main memory storing memory tables, each of said memory tables comprising a plurality of memory table entries, wherein each of said plurality of memory table entries stores information regarding memory blocks in said main memory, said computer system further comprising a processor coupled to said bus, said processor including a memory table cache, said memory table cache storing a subset of said plurality of memory table entries, wherein said processor uses said information in said plurality of memory table entries to access data in said main memory said computer system further comprising a memory controller coupled between said bus and said main memory, the method comprising the steps of:

the processor initiating a memory table cache reload cycle for causing said memory controller to load one of said plurality of memory table entries from said main memory into said memory table cache;

the memory controller reading said one of said plurality of memory table entries from one of said memory tables in said main memory responsive to said initiation by the processor of said memory table cache reload cycle;

the memory controller providing said one of said plurality of memory table entries to said processor;

the memory controller setting a status bit in said one of said plurality of memory table entries after said step of providing;

the memory controller writing said one of said plurality of memory table entries back to said main memory after said step of setting;

the memory controller asserting a status update completion signal to said processor after setting said status bit in said one of said plurality of memory table entries; and the processor performing a read/write cycle to set said status bit if said status update completion signal is not asserted.

20. The method of claim 19, further comprising the memory controller determining if said status bit in said one of said plurality of memory table entries is already set after said step of reading;

the memory controller performing said steps of setting said status bit in said one of said plurality of memory table entries and writing said one of said plurality of memory table entries back to said main memory only if said status bit is not already set; and the memory controller asserting said status update completion signal to said processor if said status bit is already set.

21. A method for reloading a memory table cache in a computer system, in a reduced number of cycles said computer system comprising a bus, main memory coupled to said bus, said main memory for storing memory tables, each of said memory tables comprising a plurality of memory table entries, wherein each of said plurality of memory table entries stores information regarding memory blocks in said main memory said, computer system further comprising a processor coupled to said bus, said processor including a memory table cache for storing a subset of said plurality of memory table entries, wherein said processor uses said information in said plurality of memory table entries to access data in said main memory, said computer system further comprising a memory controller coupled between said bus and said main memory, the method comprising the steps of:

the processor initiating a memory table cache reload cycle to cause said memory controller to load one of said plurality of memory table entries from one of said memory tables in said main memory into said memory table cache;

the memory controller reading said one of said plurality of memory table entries from said one of said memory tables responsive to said initiation of said memory table cache reload cycle;

the memory controller providing said one of said plurality of memory table entries to said processor;

the memory controller determining whether a status bit in said memory table entry is set;

the memory controller asserting a status update completion signal to said processor if said status bit is set;

the processor determining if the status update completion signal is asserted by said memory controller; and the processor setting said status bit and writing said one of said plurality of memory table entries to said main memory if the status update completion signal is not asserted by the memory controller.

22. A method for reloading a memory table cache in a processor comprising:

the processor initiating a memory table cache reload cycle for causing a memory controller connected to said processor to load a memory table entry from a main memory connected to said processor and said memory controller into said memory table cache in the processor;

the memory controller reading said memory table entry from one of said memory tables responsive to said initiation by the processor of said memory table cache reload cycle and providing said memory table entry to said processor;

the processor determining whether a status update completion signal has been asserted by said memory controller to said processor, indicating that a status bit of said memory table entry has been set; and the processor setting said status bit if said status update completion signal is not asserted.

* * * * *